US009699658B2

(12) United States Patent
E et al.

(10) Patent No.: US 9,699,658 B2
(45) Date of Patent: Jul. 4, 2017

(54) CONTROL METHOD AND APPARATUS FOR NETWORK ADMISSION (71) Applicant: Huawei Technologies Co., Ltd., Shenzhen (CN)

(72) Inventors: Wei E, Nanjing (CN); Jun Li, Shenzhen (CN); Bing Sun, Nanjing (CN); Guange Shao, Nanjing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 14/700,976

(22) Filed: Apr. 30, 2015

(65) Prior Publication Data
US 2015/0319615 A1 Nov. 5, 2015

(30) Foreign Application Priority Data
Apr. 30, 2014 (CN) .......................... 2014 1 0182130

(51) Int. Cl.
*H04W 12/06* (2009.01)
*H04W 76/02* (2009.01)
(Continued)

(52) U.S. Cl.
CPC ......... *H04W 12/08* (2013.01); *H04L 63/0876* (2013.01); *H04L 63/101* (2013.01);
(Continued)

(58) Field of Classification Search
CPC ..... H04W 12/06; H04W 48/02; H04W 76/02; H04W 12/08; H04L 63/101; H04L 63/0876
See application file for complete search history.

(56) References Cited
U.S. PATENT DOCUMENTS

2004/0264435 A1* 12/2004 Chari ................ H04L 29/12018
370/351
2006/0056448 A1* 3/2006 Zaki .................. H04W 36/0066
370/466
(Continued)

OTHER PUBLICATIONS

Calhoun, P., Ed., et al., "Control and Provisioning of Wireless Access Points (CAPWAP) Protocol Specification," RFC 5415, Mar. 2009, 156 pages.*
(Continued)

*Primary Examiner* — Yonas Bayou
(74) *Attorney, Agent, or Firm* — Conley Rose, P.C.

(57) ABSTRACT

A control method and an apparatus for network admission, which can control network admission of a wireless termination point (WTP) in a condition that a live network is not upgraded. In the method, an access controller (AC) that has a network admission control function receives a join request packet from a WTP and establishes a Control and Provisioning of Wireless Access Points (CAPWAP) connection with the WTP. If the CAPWAP connection between the AC and the WTP is successfully established, the AC enables permission of the WTP. In another control method for network admission disclosed in the present application, an AC receives a join request packet from a WTP and establishes a CAPWAP connection with the WTP. A network admission end enables permission of the WTP according to a result from the AC that the connection between the AC and the WTP is successfully established.

12 Claims, 5 Drawing Sheets

(51) Int. Cl.
  *H04W 48/02* (2009.01)
  *H04W 12/08* (2009.01)
  *H04L 29/06* (2006.01)

(52) U.S. Cl.
  CPC ........... *H04W 12/06* (2013.01); *H04W 48/02* (2013.01); *H04W 76/02* (2013.01)

(56) References Cited

U.S. PATENT DOCUMENTS

| | | | | |
|---|---|---|---|---|
| 2007/0206537 | A1* | 9/2007 | Cam-Winget | H04L 63/162 370/331 |
| 2007/0274290 | A1* | 11/2007 | Takahashi | H04L 12/4625 370/351 |
| 2008/0043637 | A1* | 2/2008 | Rahman | H04L 45/22 370/254 |
| 2011/0119737 | A1* | 5/2011 | Wen | H04L 63/0218 726/3 |
| 2013/0142074 | A1* | 6/2013 | Tiwari | H04W 72/06 370/252 |
| 2013/0171982 | A1* | 7/2013 | Barritt | H04W 12/02 455/422.1 |
| 2014/0092884 | A1* | 4/2014 | Murphy | H04L 41/00 370/338 |
| 2014/0130047 | A1* | 5/2014 | Wang | G06Q 10/00 718/1 |

OTHER PUBLICATIONS

Foreign Communication From A Counterpart Application, European Application No. 15165951.3, Extended European Search Report dated Aug. 21, 2015, 6 pages.

"Part 11: Wireless LAN Medium Access Control (MAC) and Physical Layer (PHY) Specifications," IEE Computer Society, IEEE Std 80211, Mar. 29, 2012, 2793 pages.

"Port-Based Network Access Control," IEEE Computer Society, IEEE Std 802.1X, Feb. 5, 2010, 222 pages.

* cited by examiner

CONTROL METHOD AND APPARATUS FOR NETWORK ADMISSION

CROSS-REFERENCE TO RELATED APPLICATION

This application claims priority to Chinese Patent Application No. 201410182130.1, filed on Apr. 30, 2014, which is hereby incorporated by reference in its entirety.

TECHNICAL FIELD

Embodiments of the present invention relate to communications technologies, and in particular, to a control method and an apparatus for network admission.

BACKGROUND

A wireless local area network (WLAN) provides a wireless connection service for a local area network. On a WLAN using Institute of Electrical and Electronics Engineers (IEEE) 802.11, an access controller (AC) is connected to at least one wireless termination point (WTP). A Control and Provisioning of Wireless Access Points (CAPWAP) connection may be established between the WTP and the AC, so that the AC controls the WTP using the CAPWAP protocol.

Generally, on a WLAN using IEEE 802.11, to prevent a terminal counterfeiting an Internet Protocol (IP) or Media Access Control (MAC) address of a WTP from accessing the network, an AC performs IEEE 802.1X authentication on the WTP so as to control permission of the WTP. When the IEEE 802.1X authentication performed by the AC on the WTP is successful, the permission of the WTP is enabled. If the WTP does not support an IEEE 802.1X authentication function, the WTP that does not support IEEE 802.1X authentication needs to be upgraded or replaced, including that a digital certificate or symmetric key required for authentication is set for the WTP that does not support IEEE 802.1X authentication, and deployment is difficult.

SUMMARY

In view of the above, embodiments of the present invention provide a control method for network admission, which can control network admission of a WTP in a condition that a live network is not upgraded.

The embodiments of the present invention further provide an AC and a network admission apparatus.

Technical solutions provided in the embodiments of the present invention are as follows.

According to a first aspect, a control method for network admission is provided, including receiving, by an AC, a join request packet from a WTP and establishing a CAPWAP connection with the WTP; and enabling, by the AC, permission of the WTP if the CAPWAP connection between the AC and the WTP is successfully established.

In a first possible implementation manner of the first aspect, before the receiving, by an AC, a join request packet, the method further includes acquiring, by the AC, a result of MAC authentication on the WTP; and after the MAC authentication on the WTP succeeds, setting, by the AC, the permission of the WTP to accessing a CAPWAP port of the AC.

With reference to the first aspect or the first possible implementation manner of the first aspect, a second possible implementation manner of the first aspect is further provided, where the method further includes acquiring, by the AC, a result of IEEE 802.1X authentication on the WTP; and after the IEEE 802.1X authentication on the WTP fails, setting, by the AC, the permission of the WTP to accessing the CAPWAP port of the AC.

With reference to any one of the first aspect and the first and second possible implementation manners of the first aspect, a third possible implementation manner of the first aspect is further provided, where the method further includes acquiring, by the AC from the join request packet, at least one of an Internet Protocol (IP) address of the WTP and a MAC address of the WTP, where the IP address of the WTP is a source IP address of the join request packet, and the MAC address of the WTP is a source MAC address of the join request packet; and the enabling, by the AC, permission of the WTP includes writing, by the AC, the acquired at least one of the IP address of the WTP and the MAC address of the WTP into an access control list (ACL); and writing, by the AC, enabling of the permission of the WTP into the ACL.

According to a second aspect, a control method for network admission is provided, including receiving, by an AC, a join request packet from a WTP and establishing a CAPWAP connection with the WTP; and if the CAPWAP connection between the AC and the WTP is successfully established, sending, by the AC, a result that the CAPWAP connection is successfully established to a network admission end and instructing the network admission end to enable permission of the WTP.

According to a third aspect, a control method for network admission is provided, including acquiring, by a network admission end, a result of pre-authentication on a WTP; setting, by the network admission end according to the result of the pre-authentication, permission of the WTP to accessing a CAPWAP port of an AC; receiving, by the network admission end from the AC, a result that a CAPWAP connection is successfully established; and enabling, by the network admission end, the permission of the WTP according to the result that the CAPWAP connection is successfully established.

In a first possible implementation manner of the third aspect, when the pre-authentication is MAC authentication, the result of the pre-authentication is that the MAC authentication on the WTP succeeds; or when the pre-authentication is IEEE 802.1X authentication, the result of the pre-authentication is that the IEEE 802.1X authentication on the WTP fails; or when the pre-authentication is MAC authentication and IEEE 802.1X authentication, the result of the pre-authentication is that the MAC authentication on the WTP succeeds and that the IEEE 802.1X authentication on the WTP fails.

With reference to the third aspect or the first possible implementation manner of the third aspect, a second possible implementation manner of the third aspect is further provided, where the result that the CAPWAP connection is successfully established includes at least one of an IP address of the WTP and a MAC address of the WTP; and the enabling, by the network admission end, the permission of the WTP includes writing, by the network admission end, the at least one of the IP address of the WTP and the MAC address of the WTP that is included in the result that the CAPWAP connection is successfully established into an ACL; and writing, by the network admission end, enabling of the permission of the WTP into the ACL.

According to a fourth aspect, an AC is provided, including a CAPWAP protocol processing unit configured to receive a join request packet from a WTP; a service processing unit configured to establish a CAPWAP connection with the WTP after the join request packet from the WTP is received; and an admission control unit configured to enable permission of the WTP if the CAPWAP connection between the AC and the WTP is successfully established.

In a first possible implementation manner of the fourth aspect, the AC further includes a first authentication unit; the first authentication unit is configured to acquire a result of MAC authentication on the WTP and send a result that the MAC authentication on the WTP succeeds to the admission control unit; and the admission control unit is configured to, after the MAC authentication on the WTP succeeds, set the permission of the WTP to accessing a CAPWAP port of the AC.

With reference to the fourth aspect or the first possible implementation manner of the fourth aspect, a second possible implementation manner of the fourth aspect is further provided, where the AC further includes a second authentication unit; the second authentication unit is configured to acquire a result of IEEE 802.1X authentication on the WTP and send a result that the IEEE 802.1X authentication on the WTP fails to the admission control unit; and the admission control unit is configured to, after the IEEE 802.1X authentication on the WTP fails, set the permission of the WTP to accessing the CAPWAP port of the AC.

According to a fifth aspect, an AC is provided, including a CAPWAP protocol processing unit configured to receive a join request packet from a WTP; a service processing unit configured to establish a CAPWAP connection with the WTP after the join request packet from the WTP is received; and a network admission linkage unit configured to, if the CAPWAP connection between the AC and the WTP is successfully established, send a result that the CAPWAP connection between the AC and the WTP is successfully established to a network admission apparatus and instruct the network admission apparatus to enable permission of the WTP.

According to a sixth aspect, a network admission apparatus is provided, including a pre-authentication unit configured to acquire a result of pre-authentication on a WTP; a first control unit configured to set, according to the result of the pre-authentication, permission of the WTP to accessing a CAPWAP port of an AC; a network admission linkage unit configured to receive, from the AC, a result that a CAPWAP connection is successfully established; and a second control unit configured to enable the permission of the WTP according to the result that the CAPWAP connection is successfully established.

In a first possible implementation manner of the sixth aspect, when the pre-authentication is MAC authentication, the result of the pre-authentication is that the MAC authentication on the WTP succeeds; or when the pre-authentication is IEEE 802.1X authentication, the result of the pre-authentication is that the IEEE 802.1X authentication on the WTP fails; or when the pre-authentication is MAC authentication and IEEE 802.1X authentication, the result of the pre-authentication is that the MAC authentication on the WTP succeeds and that the IEEE 802.1X authentication on the WTP fails.

Using the foregoing solutions, a network admission end or an AC that has a network admission control function can enable permission of a WTP according to a result that a CAPWAP connection between the AC and the WTP is successfully established. The network admission end or the AC that has the network admission control function can control network admission of the WTP in a condition that a live network is not upgraded.

BRIEF DESCRIPTION OF DRAWINGS

To describe the technical solutions in the embodiments of the present invention more clearly, the following briefly introduces the accompanying drawings required for describing the embodiments. The accompanying drawings in the following description show some embodiments of the present invention, and a person of ordinary skill in the art may still derive other drawings from these accompanying drawings.

DESCRIPTION OF EMBODIMENTS

To make the objectives, technical solutions, and advantages of the embodiments of the present invention clearer, the following clearly describes the technical solutions of the embodiments of the present invention with reference to the accompanying drawings in the embodiments of the present invention. The described embodiments are a part rather than all of the embodiments of the present invention. All other embodiments obtained by a person of ordinary skill in the art based on the embodiments of the present invention shall fall within the protection scope of the present invention.

In a control method for network admission provided in an embodiment of the present invention, permission of a WTP is enabled using a result that CAPWAP between the WTP and an AC is successfully established. In Embodiment 1 of the present invention, a network admission end is a device that connects a WTP and an AC. The network admission end can control permission of the WTP. If the network admission end is indirectly connected to the WTP using a forwarding device, such as a switch, a port that is of the network admission end and is connected to the WTP is a port that is of the network admission end and is connected to the forwarding device. A network admission function may also be integrated to the AC, so that the AC has a network admission control function, that is, executes a method provided in Embodiment 2. In Embodiment 2 of the present invention, an AC can control permission of a WTP. If the AC is indirectly connected to the WTP using a forwarding device, such as a switch, a port that is of the AC and is connected to the WTP is a port that is of the AC and is connected to the forwarding device.

Figure 1:
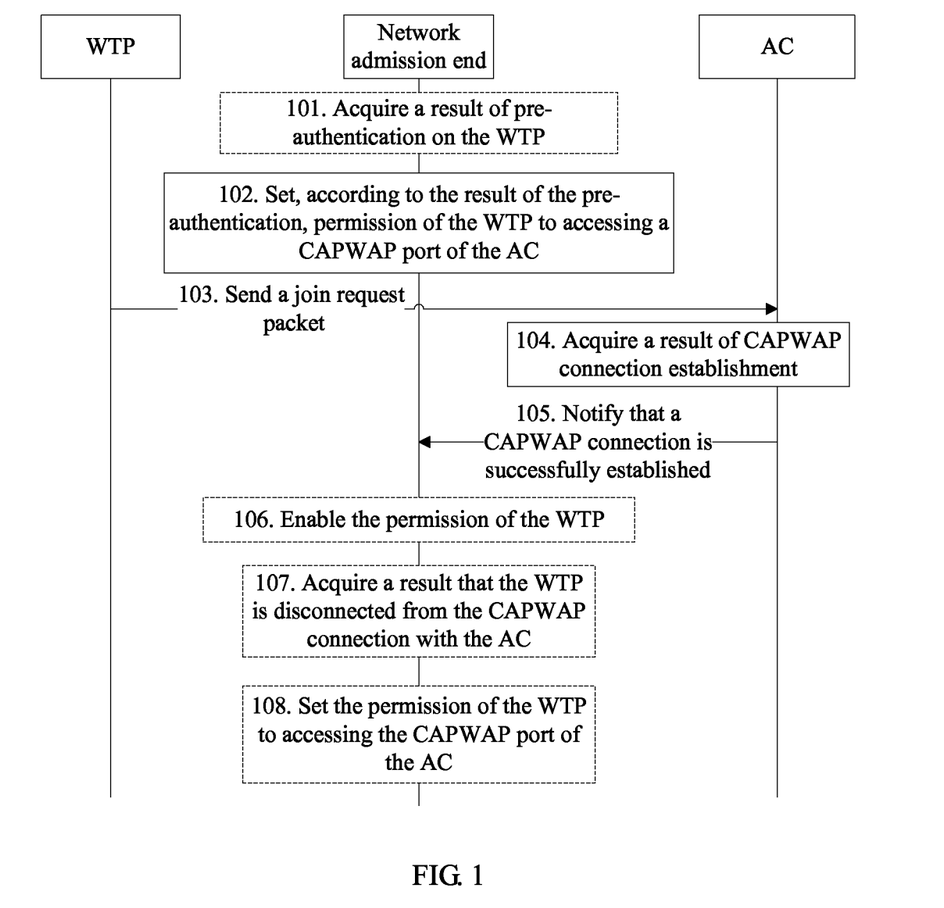
FIG. 1 is a flowchart of a control method for network admission according to Embodiment 1 of the present invention.

FIG. 1 is a flowchart of a control method for network admission according to Embodiment 1 of the present invention. In Embodiment 1, a network admission end is configured to perform network admission control on a WTP. In the method shown in FIG. 1, the network admission end and an AC are disposed on different network devices. With reference to FIG. 1, the following details the control method for network admission provided in Embodiment 1.

103. The WTP sends a join request packet to the AC.

The WTP may send the join request packet to the AC after acquiring permission to access a CAPWAP port of the AC, where the join request packet may be a Join Request in CAPWAP, and a source IP address of the Join Request is an IP address of the WTP.

104. The AC acquires a result of CAPWAP connection establishment.

The AC may acquire a result of authentication on the WTP when a Datagram Transport Layer Security (DTLS) connection is established. The AC may use a result that the authentication is successful when the DTLS connection is established as a result that a CAPWAP connection is successfully established. Optionally, the AC may use a result that the authentication on the WTP is unsuccessful when the DTLS connection is established as a result that a CAPWAP connection fails to be established. The AC may acquire, according to an IP address of the WTP, the result of the authentication on the WTP when the DTLS connection is established.

105. The AC notifies the network admission end that a CAPWAP connection is successfully established.

The AC sends a result that a CAPWAP connection between the AC and the WTP is successfully established to the network admission end using an IP packet or a proprietary protocol. The proprietary protocol is a communications protocol used between the AC and the network admission end. The result that the CAPWAP connection between the AC and the WTP is successfully established further includes at least one of the IP address of the WTP and a MAC address of the WTP. The AC may acquire the MAC address of the WTP from the join request packet.

Optionally, the AC may further send a result that a CAPWAP connection between the AC and the WTP fails to be established to the network admission end, and instruct the network admission end to set permission of the WTP to accessing the CAPWAP port of the AC or disable the permission of the WTP.

106. The network admission end enables permission of the WTP.

For example, if one physical port of the network admission end is connected to one WTP, that the network admission end enables permission of the WTP is that the network admission end enables permission of a physical port that is of the network admission end and is connected to the WTP. If one physical port of the network admission end may be connected to multiple WTPs, that the network admission end enables permission of the WTP includes, if the network admission end has acquired the IP address of the WTP, the network admission end may write the IP address of the WTP and enabling of the permission of the WTP into an ACL; or if the network admission end has acquired the MAC address of the WTP, the network admission end may write the MAC address of the WTP and enabling of the permission of the WTP into an ACL list; or if the network admission end has acquired the IP address of the WTP and the MAC address of the WTP, the network admission end may write the IP address of the WTP, the MAC address of the WTP, and enabling of the permission of the WTP into an ACL.

Optionally, before 106 in Embodiment 1, the network admission end may further disable a MAC address learning function of the physical port that is of the network admission end and is connected to the WTP. In 106, that the network admission end enables permission of the WTP includes the network admission end writes the acquired MAC address of the WTP and the port that is of the network admission end and is connected to the WTP into a MAC table. That the network admission end disables the MAC address learning function of the port that is of the network admission end and is connected to the WTP may be that a flag bit of the port that is of the network admission end and is connected to the WTP is set to not learning a MAC address. The flag bit may be used to indicate whether a MAC address is learned.

Optionally, the network admission end may further set the permission of the WTP to accessing the CAPWAP port of the AC or disable the permission of the WTP according to the result from the AC that the CAPWAP connection between the AC and the WTP fails to be established.

In Embodiment 1, the AC sends the result that the CAPWAP connection between the AC and the WTP is successfully established to the network admission end. The network admission end enables the permission of the WTP according to the result that the CAPWAP connection between the AC and the WTP is successfully established. In this way, an IEEE 802.1X authentication function does not need to be set for the WTP, and network admission control on the WTP is implemented in a condition that a live network is not upgraded.

Optionally, before 103 in Embodiment 1, the method further includes the following steps:

101. The network admission end acquires a result of pre-authentication on the WTP.

For example, if the pre-authentication is MAC authentication, the result of the pre-authentication is that the MAC authentication on the WTP succeeds or the MAC authentication on the WTP fails. If the pre-authentication is IEEE 802.1X authentication, the result of the pre-authentication is that the IEEE 802.1X authentication on the WTP fails or the IEEE 802.1X authentication on the WTP succeeds. If the pre-authentication is MAC authentication and IEEE 802.1X authentication, the result of the pre-authentication is any combination of a result of the MAC authentication and a result of the IEEE 802.1X authentication. The IEEE 802.1X authentication mentioned in this embodiment of the present invention may be an authentication manner in the IEEE 802.1x-2004 protocol.

In an example in which the pre-authentication is the MAC authentication, the network admission end may acquire the MAC address of the WTP from an Address Resolution Protocol (ARP) packet or a Dynamic Host Configuration Protocol (DHCP) packet sent by the WTP. The network admission end may perform the MAC authentication on the MAC address of the WTP and acquire a result of the MAC authentication on the WTP. Alternatively, the network admission end sends the MAC address of the WTP to an authentication, authorization and accounting (AAA) server and acquires a result of the MAC authentication on the WTP from the AAA server. The AAA server may add an extended attribute in a packet to be sent to the network admission end, where the attribute is used to identify that a device on which the MAC authentication is performed is a WTP device, so that the network admission end recognizes the WTP device.

In an example in which the pre-authentication is the IEEE 802.1X authentication, the network admission end may perform the IEEE 802.1X authentication on the WTP and acquire a result of the IEEE 802.1X authentication on the WTP. Alternatively, the network admission sends acquired data used for performing the IEEE 802.1X authentication to a device that is capable of performing the IEEE 802.1X authentication and acquires, from the device that is capable of performing the IEEE 802.1X authentication, a result of the IEEE 802.1X authentication on the WTP.

102. The network admission end sets, according to the result of the pre-authentication, the permission of the WTP to accessing a CAPWAP port of the AC.

The CAPWAP port in this embodiment of the present invention may be a port 5246 or a port 5247 of the User Datagram Protocol (UDP). In this embodiment of the present invention, permission to access the CAPWAP port of the AC may be that, if a destination port in a packet from the WTP is the CAPWAP port, the packet is allowed to pass.

In an example in which the pre-authentication is the MAC authentication, the network admission end sets, according to a result that the MAC authentication on the WTP succeeds, the permission of the WTP to accessing the CAPWAP port of the AC. In an example in which the pre-authentication is the IEEE 802.1X authentication, the network admission end sets, according to a result that the IEEE 802.1X authentication on the WTP fails, the permission of the WTP to accessing the CAPWAP port of the AC. In an example in which the pre-authentication is the MAC authentication and the IEEE 802.1X authentication, the network admission end sets, according to a result that the MAC authentication on the WTP succeeds and that the IEEE 802.1X authentication on the WTP fails, the permission of the WTP to accessing the CAPWAP port of the AC.

For example, that the network admission end sets the permission of the WTP to accessing the CAPWAP port of the AC may include the network admission end may write at least one of the IP address of the WTP and the MAC address of the WTP into an ACL; and the network admission end writes the permission to access the CAPWAP port of the AC into the ACL. In the ACL, the permission to access the CAPWAP port of the AC is corresponding to at least one of the IP address of the WTP and the MAC address of the WTP.

Optionally, after 106 in Embodiment 1, the method further includes the following steps:

107. The network admission end acquires a result that the WTP is disconnected from the CAPWAP connection with the AC.

The network admission end may acquire, from the AC, the result that the WTP is disconnected from the CAPWAP connection. Alternatively, the network admission connects the AC and the WTP, and the network admission end may detect by monitoring that the WTP is disconnected from the CAPWAP connection with the AC.

108. The network admission end sets the permission of the WTP to accessing the CAPWAP port of the AC.

For example, that the network admission end sets the permission of the WTP to accessing the CAPWAP port of the AC may include the network admission end may write at least one of the IP address of the WTP and the MAC address of the WTP into an ACL; and the network admission end writes the permission to access the CAPWAP port of the AC into the ACL. In the ACL, the permission to access the CAPWAP port of the AC is corresponding to at least one of the IP address of the WTP and the MAC address of the WTP.

In Embodiment 1, after the WTP is disconnected from the CAPWAP connection with the AC, the network admission end may adjust the permission of the WTP to accessing the CAPWAP port of the AC.

Figure 2:
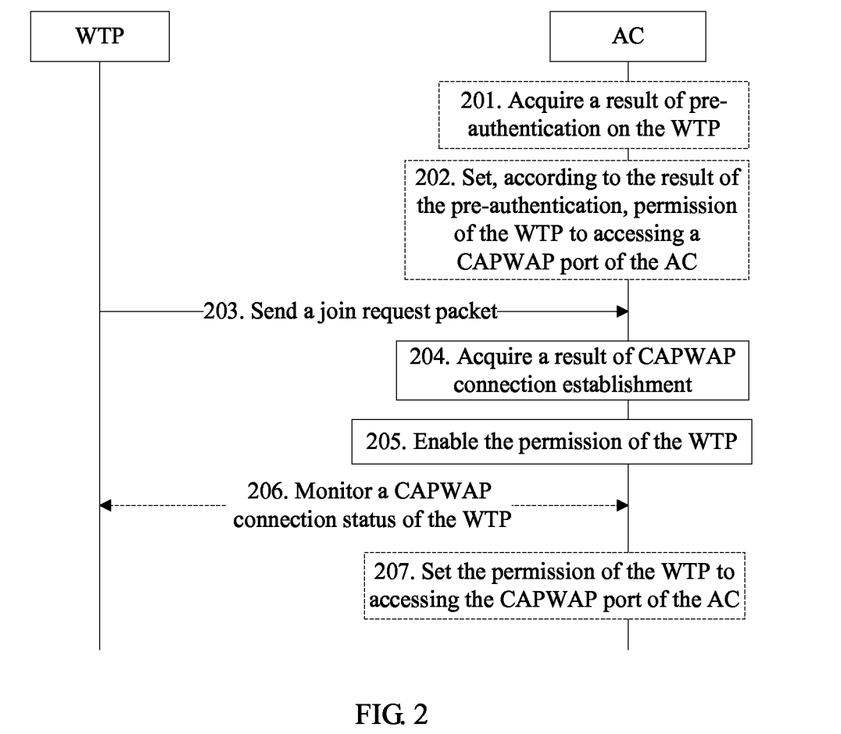
FIG. 2 is a flowchart of a control method for network admission according to Embodiment 2 of the present invention.

FIG. 2 is a flowchart of a control method for network admission according to Embodiment 2 of the present invention. In Embodiment 2, an AC is configured to perform network admission control on a WTP. That is, the AC has network admission and wireless access service functions. With reference to FIG. 2, the following details the control method for network admission provided in Embodiment 2.

203. The WTP sends a join request packet to the AC.

The WTP may send the join request packet to the AC after acquiring permission to access a CAPWAP port of the AC, where the join request packet may be a Join Request in CAPWAP. The method for sending the Join Request to the AC by the WTP in 203 is the same as that in 103 in Embodiment 1.

204. The AC acquires a result of CAPWAP connection establishment.

The method for acquiring the result of the CAPWAP connection establishment by the AC in 204 is the same as that in 104 in Embodiment 1.

205. The AC enables permission of the WTP.

If a CAPWAP connection between the AC and the WTP is successfully established, the AC enables the permission of the WTP.

The method for enabling the permission of the WTP by the AC in Embodiment 2 is the same as that for enabling the permission of the WTP by the network admission end in Embodiment 1. In Embodiment 2, if the AC is connected to the WTP using a forwarding device, such as a switch or a router, a port that is of the AC and is connected to the WTP is a port that is of the AC and is connected to the forwarding device.

Optionally, when the CAPWAP connection between the AC and the WTP fails to be established, the AC sets the permission of the WTP to accessing the CAPWAP port of the AC or disables the permission of the WTP.

In Embodiment 2, the AC may implement, according to the result of the CAPWAP connection establishment between the AC and the WTP, network admission control on the WTP. An IEEE 802.1X authentication function does not need to be set for the WTP and the network admission control on the WTP is implemented in a condition that a live network is not upgraded.

Optionally, before 203 in Embodiment 2, the method further includes the following steps:

201. The AC acquires a result of pre-authentication on the WTP.

The method for acquiring the result of the pre-authentication on the WTP by the AC in 201 is the same as the method for acquiring the result of the pre-authentication on the WTP by the network admission end in Embodiment 1.

202. The AC sets, according to the result of the pre-authentication, the permission of the WTP to accessing a CAPWAP port of the AC.

The method for setting the permission of the WTP according to the result of the pre-authentication by the AC in 202 is the same as the method for setting the permission of the WTP according to the result of the pre-authentication by the network admission end in Embodiment 1.

Optionally, after 205 in Embodiment 2, the method further includes the following steps:

206. The AC monitors a CAPWAP connection status of the WTP.

The AC may monitor the CAPWAP connection status of the WTP by means of the CAPWAP protocol, so as to acquire a result that the WTP is disconnected from the CAPWAP connection.

207. The AC sets the permission of the WTP to accessing the CAPWAP port of the AC.

The method for setting the permission of the WTP by the AC in Embodiment 2 is the same as the method for setting the permission of the WTP by the network admission end in Embodiment 1.

In Embodiment 2, after the WTP is disconnected from the CAPWAP connection with the AC, the AC may adjust the permission of the WTP to accessing the CAPWAP port of the AC.

Figure 3:
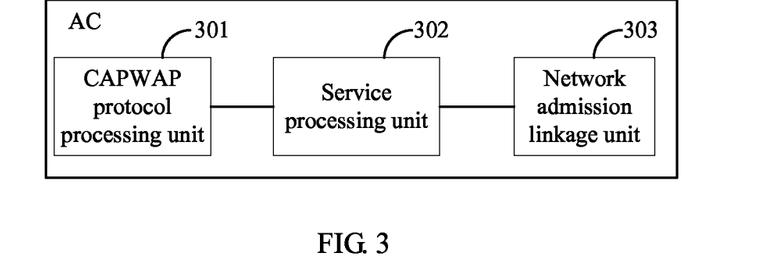
FIG. 3 is a schematic structural diagram of an AC according to Embodiment 1 of the present invention.

FIG. 3 is a schematic structural diagram of an AC according to Embodiment 1 of the present invention. A wireless access service apparatus shown in FIG. 3 communicates with a WTP and a network admission apparatus. With reference to FIG. 3, the following describes the AC provided in Embodiment 1 of the present invention.

The AC provided in Embodiment 1 includes a CAPWAP protocol processing unit 301, a service processing unit 302, and a network admission linkage unit 303.

The CAPWAP protocol processing unit 301 is configured to receive a join request packet from a WTP, where the join request packet may be a Join Request in CAPWAP, and a source IP address of the Join Request is an IP address of the WTP. For example, the CAPWAP protocol processing unit 301 may be configured to perform CAPWAP protocol parsing. The CAPWAP protocol processing unit 301 may parse the join request packet to obtain the IP address of the WTP.

The service processing unit 302 is configured to, after the CAPWAP protocol processing unit 301 receives the join request packet from the WTP, establish a CAPWAP connection with the WTP. The service processing unit 302 sends a result that the CAPWAP connection between the AC and the WTP is successfully established to the network admission linkage unit 303. Optionally, the service processing unit 302 may also send a result that the CAPWAP connection between the AC and the WTP fails to be established to the network admission linkage unit 303. For example, after a message that is related to the Join Request and sent by the CAPWAP protocol processing unit 301 is received, the service processing unit 302 may determine that the CAPWAP protocol processing unit 301 has received the join request packet from the WTP. The service processing unit 302 starts a process of establishing the CAPWAP connection with the WTP.

The network admission linkage unit 303 is configured to send the result that the CAPWAP connection between the AC and the WTP is successfully established to a network admission apparatus and instruct the network admission apparatus to enable permission of the WTP according to the result that the CAPWAP connection is successfully established. Optionally, the network admission linkage unit 303 may be further configured to send the result that the CAPWAP connection fails to be established to the network admission apparatus.

In the foregoing Embodiment 1, the service processing unit acquires the result that the CAPWAP connection between the AC and the WTP is successfully established. The network admission linkage unit sends the result that the CAPWAP connection between the AC and the WTP is successfully established to the network admission apparatus and instructs the network admission apparatus to enable the permission of the WTP according to the result that the CAPWAP connection is successfully established.

Optionally, the AC shown in FIG. 3 further includes a status monitoring unit (not shown in FIG. 3). The status monitoring unit is configured to monitor a status of the CAPWAP connection between the AC and the WTP. The status monitoring unit is configured to generate a connection status packet when the WTP is disconnected from the CAPWAP connection with the AC. The connection status packet includes at least one of the IP address of the WTP and a MAC address of the WTP. The network admission linkage unit 303 is configured to send the connection status packet to the network admission apparatus and instruct the network admission apparatus to set, according to the connection status packet, the permission of the WTP to accessing a CAPWAP port of the AC.

In the foregoing Embodiment 1, after the WTP is disconnected from the CAPWAP connection with the AC, the status monitoring unit may instruct the network admission apparatus to adjust the permission of the WTP to accessing the CAPWAP port of the AC, which helps reduce network security risks.

Figure 4:
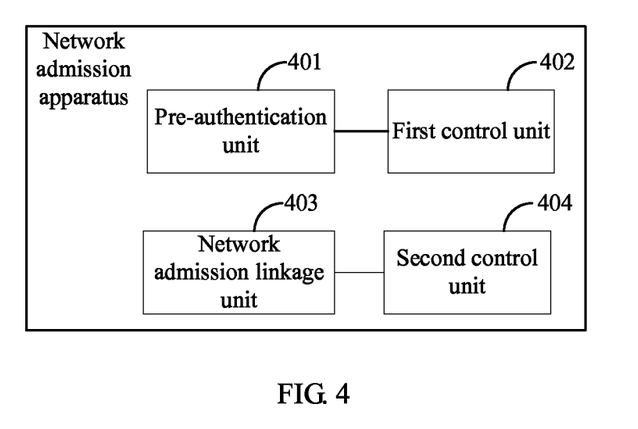
FIG. 4 is a schematic structural diagram of a network admission apparatus according to Embodiment 1 of the present invention.

FIG. 4 is a schematic structural diagram of a network admission apparatus according to Embodiment 1 of the present invention. The network admission apparatus shown in FIG. 4 is a device directly connected to a WTP. With reference to FIG. 4, the following details the network admission apparatus provided in Embodiment 1 of the present invention.

The network admission apparatus provided in Embodiment 1 includes a pre-authentication unit 401, a first control unit 402, a network admission linkage unit 403, and a second control unit 404.

The pre-authentication unit 401 is configured to acquire a result of pre-authentication on a WTP. If the pre-authentication is MAC authentication, the result of the pre-authentication may be that the MAC authentication on the WTP succeeds or the MAC authentication on the WTP fails. If the pre-authentication is IEEE 802.1X authentication, the result of the pre-authentication may be that the IEEE 802.1X authentication on the WTP fails or the IEEE 802.1X authentication on the WTP succeeds. If the pre-authentication is MAC authentication and IEEE 802.1X authentication, the result of the pre-authentication may be that the MAC authentication on the WTP succeeds and that the IEEE 802.1X authentication on the WTP fails.

The first control unit 402 is configured to set, according to the result of the pre-authentication, permission of the WTP to accessing a CAPWAP port of an AC. For example, if the result of the pre-authentication is at least one of the result that the MAC authentication on the WTP succeeds and the result that the IEEE 802.1X authentication on the WTP fails, the first control unit 402 may set the permission of the WTP to accessing the CAPWAP port of the AC.

The network admission linkage unit 403 is configured to receive, from the AC, a result that a CAPWAP connection is successfully established. The result that the CAPWAP connection is successfully established further includes at least one of an IP address of the WTP and a MAC address of the WTP. The MAC address of the WTP may be acquired from a join request packet or acquired in a pre-authentication process.

The second control unit 404 is configured to enable the permission of the WTP according to the result that the CAPWAP connection is successfully established. For example, if the result that the CAPWAP connection is successfully established includes at least one of the IP address of the WTP and the MAC address of the WTP, the second control unit 404 may write, into an ACL, the at least one of the IP address of the WTP and the MAC address of the WTP that is included in the result that the CAPWAP is successfully established. The second control unit 404 further writes enabling of the permission of the WTP into the ACL. In the ACL, the enabling of the permission of the WTP is corresponding to at least one of the IP address of the WTP and the MAC address of the WTP.

Optionally, the second control unit 404 may further set the permission of the WTP to accessing the CAPWAP port of the AC or disable the permission of the WTP according to a result that the CAPWAP connection fails to be established.

In Embodiment 1, after the CAPWAP connection between the AC and the WTP is successfully established, the second control unit enables the permission of the WTP, so that a WTP that does not support IEEE 802.1X authentication can also acquire access permission after a CAPWAP between the WTP and a wireless access service apparatus is successfully established.

Optionally, the network admission linkage unit 403 in the network admission apparatus shown in FIG. 4 is configured to receive a connection status packet from the AC. The second control unit 404 is configured to set permission of a WTP port to accessing the CAPWAP port of the AC or disable the permission of the WTP port after it is determined, according to the connection status packet, that the CAPWAP connection between the AC and the WTP is disconnected.

In Embodiment 1, the second control unit may dynamically adjust the permission of the WTP according to a status of the CAPWAP connection between the AC and the WTP, which helps reduce network security risks.

Figure 5:
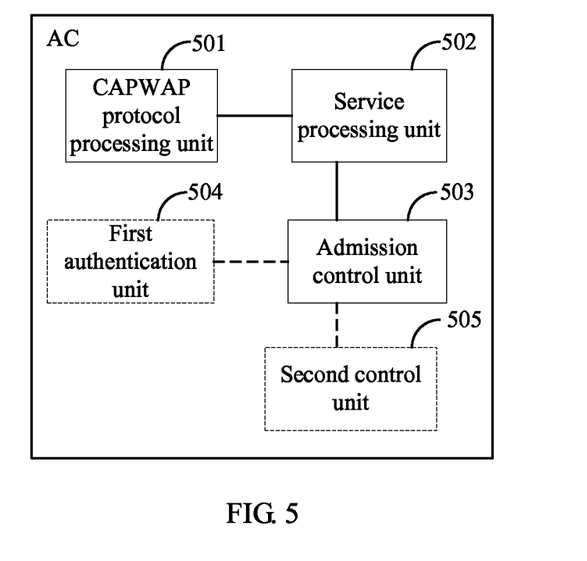
FIG. 5 is a schematic structural diagram of an AC according to Embodiment 2 of the present invention.

FIG. 5 is a schematic structural diagram of an AC according to Embodiment 2 of the present invention. The AC in Embodiment 2 has a network admission control function and a wireless access service function. With reference to FIG. 5, the following details the AC provided in Embodiment 2 of the present invention.

The AC provided in Embodiment 2 includes a CAPWAP protocol processing unit 501, a service processing unit 502, and an admission control unit 503.

The CAPWAP protocol processing unit 501 is configured to receive a join request packet from a WTP, where the join request packet may be a Join Request in CAPWAP, and a source IP address of the Join Request is an IP address of the WTP.

The service processing unit 502 is configured to establish a CAPWAP connection with the WTP when the join request packet from the WTP is received. The service processing unit 502 in Embodiment 2 is the same as the service processing unit 302 included in the AC in Embodiment 1, and therefore details are not described herein again.

If the CAPWAP connection between the AC and the WTP is successfully established, the admission control unit 503 is configured to enable permission of the WTP. That is, the admission control unit 503 may enable the permission of the WTP according to a result from the service processing unit 502 that the CAPWAP connection between the AC and the WTP is successfully established. Optionally, the admission control unit 503 may further set the permission of the WTP to accessing a CAPWAP port of the AC or disable the permission of the WTP according to a result from the service processing unit 502 that the CAPWAP connection between the AC and the WTP fails to be established.

For example, the admission control unit 503 determines to enable the permission of the WTP and writes enabling of the permission of the WTP into an ACL. The admission control unit 503 may write, into the ACL, at least one of the IP address of the WTP and a MAC address of the WTP that are acquired. In the ACL, the enabling of the permission of the WTP is corresponding to at least one of the IP address of the WTP and the MAC address of the WTP.

In Embodiment 2, the admission control unit may enable the permission of the WTP according to the result acquired by the service processing unit that the CAPWAP connection is successfully established.

Optionally, the AC in Embodiment 2 further includes a first authentication unit 504. The first authentication unit 504 is configured to acquire a result of MAC authentication on the WTP and send a result that the MAC authentication on the WTP succeeds to the admission control unit 503. The admission control unit 503 is configured to, after the MAC authentication on the WTP succeeds, set the permission of the WTP to accessing the CAPWAP port of the AC.

Optionally, the AC in Embodiment 2 further includes a second control unit 505. The second control unit 505 is configured to acquire a result of IEEE 802.1X authentication on the WTP and send a result that the IEEE 802.1X authentication on the WTP fails to the admission control unit 503. The admission control unit 503 is configured to, after the IEEE 802.1X authentication on the WTP fails, set the permission of the WTP to accessing the CAPWAP port of the AC.

Optionally, the service processing unit 502 in Embodiment 2 is configured to monitor a status of the CAPWAP connection between the AC and the WTP. The service processing unit 502 is configured to generate a connection status message when the CAPWAP connection between the AC and the WTP is disconnected. The connection status message includes at least one of the IP address of the WTP and the MAC address of the WTP. The admission control unit 503 is configured to, according to the connection status message sent by the service processing unit 502, set the permission of the WTP to accessing the CAPWAP port of the AC or disable the permission of the WTP.

In Embodiment 2, the service processing unit may further notify the admission control unit using the connection status message after the WTP is disconnected from the CAPWAP connection with the AC. The admission control unit adjusts the permission of the WTP according to the connection status message, which helps reduce network security risks.

Figure 6:
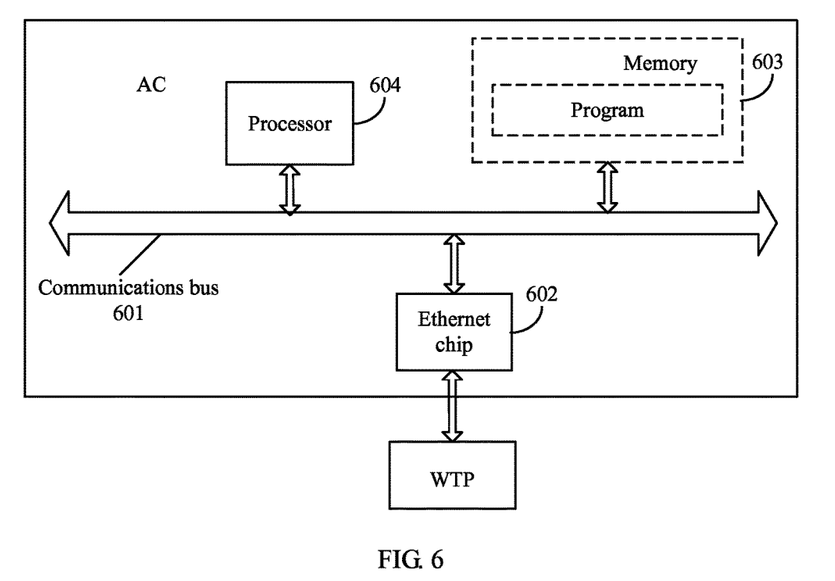
FIG. 6 is a schematic structural diagram of an AC according to Embodiment 3 of the present invention.

FIG. 6 is a schematic structural diagram of an AC according to Embodiment 3 of the present invention. The AC provided in Embodiment 3 has a wireless access service function and a network admission control function. As shown in FIG. 6, the AC includes an Ethernet chip 602 and a processor 604. The Ethernet chip 602 and the processor 604 are connected using a communications bus 601. If the processor 604 in the AC is a central processing unit (CPU), the AC further includes a memory 603 that is configured to store a program. The memory 603 is connected to the CPU using the communications bus 601. If the processor 604 in the AC is a network processor (NP), a storage medium included in the NP may be configured to store a program.

If the processor 604 is a CPU, the CPU reads the program in the memory 603. If the processor 604 is an NP, the NP acquires the stored program. The CPU or the NP may perform the following operations according to the program that is read: receiving a join request packet from a WTP using the Ethernet chip 602 and establishing a CAPWAP connection with the WTP; and when the CAPWAP connection between the AC and the WTP is successfully established, enabling permission of the WTP.

Control of the permission of the WTP by the processor 604 may be implemented by controlling the Ethernet chip 602. Because the AC is directly connected to the WTP, the Ethernet chip 602 in the AC may use a port that receives the join request packet as a port that is of the AC and is connected to the WTP. Optionally, the processor 604 may write at least one of an IP address of the WTP and a MAC address of the WTP into an ACL in the Ethernet chip 602. The processor 604 may further write enabling of the permission of the WTP into the ACL in the Ethernet chip 602.

Optionally, if the processor 604 is a CPU, the memory 603 may store a result of authentication on the WTP by the AC. The processor 604 may use the result, in the memory 603, of the authentication on the WTP by the AC as a result of CAPWAP connection establishment between the AC and the WTP.

Figure 7:
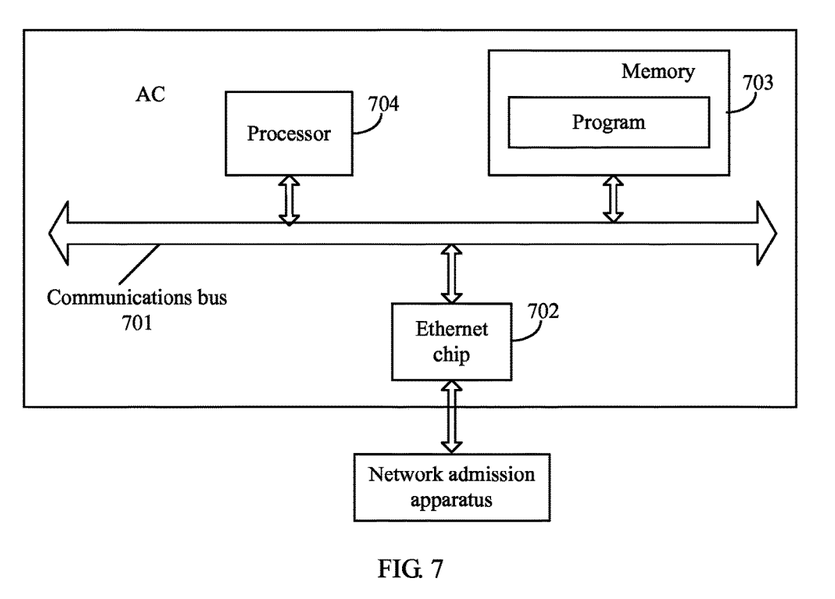
FIG. 7 is a schematic structural diagram of an AC according to Embodiment 4 of the present invention.

FIG. 7 is a schematic structural diagram of an AC according to Embodiment 4 of the present invention. The AC in Embodiment 4 has a wireless access service function. As shown in FIG. 7, the AC includes an Ethernet chip 702, a memory 703, and a processor 704. The Ethernet chip 702, the memory 703, and the processor 704 are connected using a communications bus 701.

The memory 703 is configured to store a program.

The processor 704 reads the program from the memory 703 and performs the following operations: receiving a join request packet from a WTP using the Ethernet chip 702; after the join request packet from the WTP is received, establishing a CAPWAP connection with the WTP; and sending a result that the CAPWAP connection is successfully established to a network admission apparatus using the Ethernet chip 702.

The network admission apparatus in Embodiment 4 connects the WTP and the AC. The network admission apparatus may forward the join request from the WTP to the AC. In this way, the Ethernet chip 702 may send the result that the CAPWAP connection is successfully established to the network admission apparatus through a port that receives the join request packet of the WTP.

Optionally, the memory 703 may store a result of authentication on the WTP by the AC. The processor 704 may use the result, in the memory 703, of the authentication on the WTP by the AC as a result of CAPWAP connection establishment between the AC and the WTP.

Figure 8:
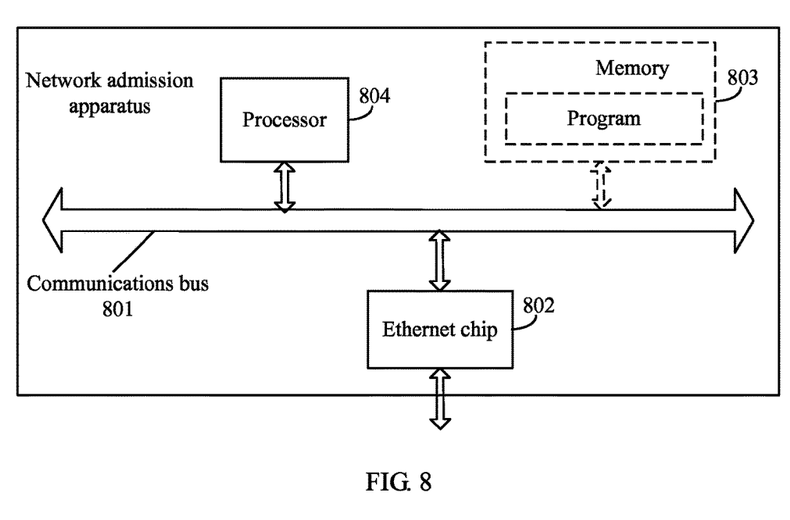
FIG. 8 is a schematic structural diagram of a network admission apparatus according to Embodiment 4 of the present invention.

FIG. 8 is a schematic structural diagram of a network admission apparatus according to Embodiment 4 of the present invention. The network admission apparatus may be a switch or a router. The network admission apparatus shown in FIG. 8 includes an Ethernet chip 802 and a processor 804. The Ethernet chip 802 and the processor 804 are connected using a communications bus 801. If the processor 804 in the network admission apparatus is a CPU, the network admission apparatus further includes a memory 803 configured to store a program. The memory 803 is connected to the CPU using the communications bus 801. If the processor 804 in the network admission apparatus is an NP, a storage medium included in the NP may be configured to store a program.

If the processor 804 is a CPU, the CPU reads the program in the memory 803. If the processor 804 is an NP, the NP acquires the stored program. The CPU or the NP may perform the following operations according to the program that is read: acquiring a result of pre-authentication on a WTP; setting, according to the result of the pre-authentication and using the Ethernet chip 802, permission of the WTP to accessing a CAPWAP port of an AC; receiving, from the AC and using the Ethernet chip 802, a result that a CAPWAP connection is successfully established; and enabling the permission of the WTP according to the result that the CAPWAP connection is successfully established and using the Ethernet chip 802.

Control on the permission of the WTP by the processor 804 included in the network admission apparatus in Embodiment 4 may be implemented by controlling the Ethernet chip 802. Because the network admission apparatus is directly connected to the WTP, the Ethernet chip 802 may use a port that receives a packet from the WTP as a port that is of the network admission apparatus and is connected to the WTP. Optionally, the processor 804 may write at least one of an IP address of the WTP and a MAC address of the WTP into an ACL in the Ethernet chip 802. The processor 804 may further write permission of the port that is of the network admission apparatus and is connected to the WTP into the ACL in the Ethernet chip 802.

In the foregoing embodiments of the present invention, the permission of the WTP is network access permission that is acquired by the WTP in a process of network admission control on the WTP.

The general purpose processor may be a microprocessor or may be any conventional processor. Steps of the methods disclosed with reference to the embodiments of the present invention may be directly executed and completed by a combination of hardware and software modules in the processor. When software is used for implementation, code implementing the foregoing functions may be stored in a computer readable medium. The computer readable medium includes a computer storage medium. The storage medium may be any usable medium that can be accessed by a computer, for example but not limited to, the computer readable medium may be a random-access memory (RAM), a read-only memory (ROM), an electrically erasable programmable read-only memory (EEPROM), a compact disc read-only memory (CD-ROM) or another optical disc memory, a disk storage medium or another magnetic storage device, or any other medium that can be used to carry or store expected program code in an instruction or data structure format and can be accessed by a computer. The computer readable medium may be a compact disk (CD), a laser disc, a digital video disc (DVD), a floppy disk, or a Blu-ray disc.

In summary, what is described above is merely exemplary embodiments of the technical solutions of the present invention, but is not intended to limit the protection scope of the present invention. Any modification, equivalent replacement, or improvement made without departing from the principle of the present invention shall fall within the protection scope of the present invention.

What is claimed is:

1. A control method for network admission comprising:
   enabling, by an access controller (AC), a first permission of a wireless termination point (WTP), wherein the first permission of the WTP is configured to allow only packets accessing a Control and Provisioning of Wireless Access Points (CAPWAP) port of the AC;
   receiving a join request packet that accesses the CAPWAP port from the WTP when the first permission of the WTP is enabled;
   establishing a CAPWAP connection with the WTP; and
   enabling, by the AC, a second permission of the WTP when the CAPWAP connection between the AC and the WTP is successfully established, wherein the second permission of the WTP is configured to allow any packet sent from the WTP.

2. The method according to claim 1, wherein before receiving, by the AC, the join request packet, the method further comprises:
   acquiring, by the AC, a result of Media Access Control (MAC) authentication on the WTP; and enabling, by the AC, the first permission of the WTP to only allow access to the CAPWAP port of the AC after the MAC authentication on the WTP succeeds.

3. The method according to claim 2 further comprising:
acquiring, by the AC, a result of IEEE 802.1X authentication on the WTP; and
enabling, by the AC, the first permission of the WTP to only allow access to the CAPWAP port of the AC after the IEEE 802.1X authentication on the WTP fails.

4. The method according to claim 3 further comprising acquiring, by the AC and from the join request packet, at least one of an IP address of the WTP or a MAC address of the WTP, wherein the IP address of the WTP is a source IP address of the join request packet, wherein the MAC address of the WTP is a source MAC address of the join request packet, and wherein enabling, by the AC, the second permission of the WTP comprises:
writing, by the AC, the acquired at least one of the IP address of the WTP or the MAC address of the WTP into an ACL; and
writing, by the AC, information about allowing any packet from the WTP into the ACL.

5. The method according to claim 2 further comprising acquiring, by the AC and from the join request packet, at least one of an IP address of the WTP or a MAC address of the WTP, wherein the IP address of the WTP is a source IP address of the join request packet, wherein the MAC address of the WTP is a source MAC address of the join request packet, and wherein enabling, by the AC, the second permission of the WTP comprises:
writing, by the AC, the acquired at least one of the IP address of the WTP or the MAC address of the WTP into an access control list (ACL); and
writing, by the AC, information about allowing any packet sent from the WTP into the ACL.

6. The method according to claim 1 further comprising:
acquiring, by the AC, a result of Institute of Electrical and Electronics Engineers (IEEE) 802.1X authentication on the WTP; and
enabling, by the AC, the first permission of the WTP to only allow access to the CAPWAP port of the AC after the IEEE 802.1X authentication on the WTP fails.

7. The method according to claim 6 further comprising acquiring, by the AC and from the join request packet, at least one of an IP address of the WTP or a MAC address of the WTP, wherein the IP address of the WTP is a source IP address of the join request packet, wherein the MAC address of the WTP is a source MAC address of the join request packet, and wherein enabling, by the AC, the second permission of the WTP comprises:
writing, by the AC, the acquired at least one of the IP address of the WTP or the MAC address of the WTP into an ACL; and
writing, by the AC, information about allowing any packet from the WTP into the ACL.

8. The method according to claim 1 further comprising acquiring, by the AC and from the join request packet, at least one of an Internet Protocol (IP) address of the WTP or a MAC address of the WTP, wherein the IP address of the WTP is a source IP address of the join request packet, wherein the MAC address of the WTP is a source MAC address of the join request packet, and wherein enabling, by the AC, the second permission of the WTP comprises:
writing, by the AC, the acquired at least one of the IP address of the WTP or the MAC address of the WTP into an access control list (ACL); and
writing, by the AC, information about allowing any packet from the WTP into the ACL.

9. An access controller (AC) comprising:
an Ethernet chip; and
a processor, wherein the processor is configured to:
enable a first permission of a wireless termination point (WTP), wherein the first permission of the WTP is configured to allow only packets accessing a Control and Provisioning of Wireless Access Points (CAPWAP) port of the AC;
receive a join request packet that accesses the CAPWAP port from the WTP using the Ethernet chip when the first permission of the WTP is enabled;
establish a CAPWAP connection with the WTP; and
enable a second permission of the WTP when the CAPWAP connection between the AC and the WTP is successfully established, wherein control of the second permission of the WTP by the processor is implemented by controlling the Ethernet chip, and wherein the Ethernet chip is configured to allow any packet from the WTP by controlling of the second permission of the WTP.

10. The AC according to claim 9, wherein the processor is further configured to:
acquire a result of Media Access Control (MAC) authentication on the WTP before receiving the join request packet; and
enable the first permission of the WTP to only allow access to the CAPWAP port of the AC after the MAC authentication on the WTP succeeds.

11. The AC according to claim 9, wherein the processor is further configured to:
acquire a result of Institute of Electrical and Electronics Engineers (IEEE) 802.1X authentication on the WTP; and
enable the first permission of the WTP to only allow access to the CAPWAP port of the AC after the IEEE 802.1X authentication on the WTP fails.

12. The AC according to claim 9, wherein the processor is further configured to:
acquire, from the join request packet, at least one of an Internet Protocol (IP) address of the WTP or a MAC address of the WTP, wherein the IP address of the WTP is a source IP address of the join request packet, and wherein the MAC address of the WTP is a source MAC address of the join request packet;
write the acquired at least one of the IP address of the WTP or the MAC address of the WTP into an access control list (ACL) of the Ethernet chip; and
write information about allowing any packet from the WTP into the ACL.

* * * * *

UNITED STATES PATENT AND TRADEMARK OFFICE
CERTIFICATE OF CORRECTION

PATENT NO. : 9,699,658 B2
APPLICATION NO. : 14/700976
DATED : July 4, 2017
INVENTOR(S) : Wei E et al.

Page 1 of 1

It is certified that error appears in the above-identified patent and that said Letters Patent is hereby corrected as shown below:

On the Title Page

Page 2, Column 2, Other Publications should read:
"Part 11: Wireless LAN Medium Access control (MAC) and Physical Layer (PHY) Specifications,"
IEEE Computer Society, IEEE Std 802.11, Mar. 29, 2012, 2793 pages.

Signed and Sealed this
Fifth Day of September, 2017

Joseph Matal
*Performing the Functions and Duties of the*
*Under Secretary of Commerce for Intellectual Property and*
*Director of the United States Patent and Trademark Office*